Nov. 3, 1942. J. D. RUSSELL 2,301,144
WHEEL MOUNTING DEVICE
Original Filed July 3, 1939  2 Sheets-Sheet 1

INVENTOR
John D. Russell
By Harold W. Hawkins
His Attorney

Nov. 3, 1942.   J. D. RUSSELL   2,301,144
WHEEL MOUNTING DEVICE
Original Filed July 3, 1939   2 Sheets-Sheet 2

INVENTOR
John D. Russell
By
Harold W. Hawkins
His Attorney

Patented Nov. 3, 1942

2,301,144

UNITED STATES PATENT OFFICE 2,301,144

WHEEL MOUNTING DEVICE

John D. Russell, Sugarcreek Township, Venango County, Pa., assignor to Joy Manufacturing Company, a corporation of Pennsylvania Original application July 3, 1939, Serial No. 282,582. Divided and this application February 26, 1941, Serial No. 380,593

9 Claims. (Cl. 280—96.2)

This machine relates to vehicles, and more particularly to an improved wheel mounting and steering control for self-propelled vehicles, and is a division of my copending application Serial No. 282,582, filed July 3, 1939, and now abandoned.

The principal object of this invention is to provide a wheel mounting for a vehicle which will permit the body of the vehicle to be elevated relative to the wheels.

Another object is to provide a wheel mounting for vehicles which combines in one unit a shock absorbing element and an elevating device for raising the body of the vehicle relative to the wheels.

A further object is to provide a wheel mounting for vehicles which will not only permit the body of the vehicle to be elevated relative thereto, but which is capable of being turned as a unit to steer the vehicle.

A still further object is to provide a combined steering, spring suspension and elevating device between the wheels and the body of a vehicle which will permit the body to be raised and lowered relative to the wheels of the vehicle, act as shock absorbers during travel of the vehicle, and provide the steering mechanism for the vehicle.

These and other objects which will hereinafter be made apparent to those skilled in this particular art, are accomplished by means of this invention, one embodiment of which is described in the following specification and disclosed in the accompanying drawings, wherein.

Figure 1:
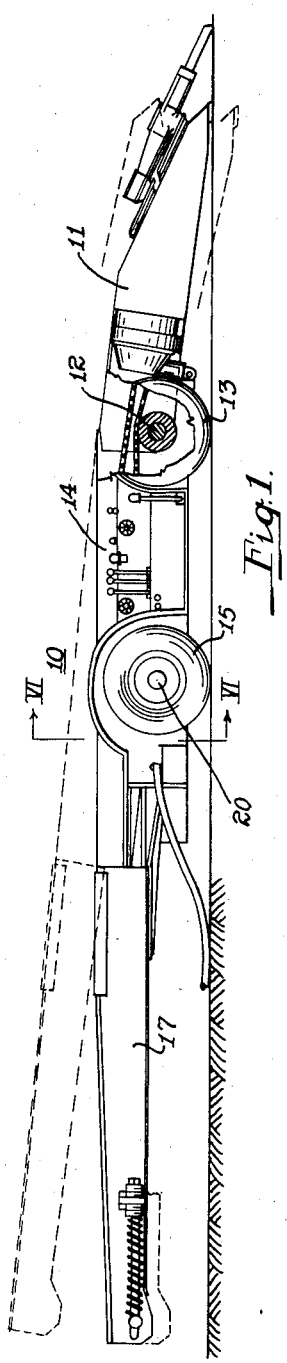
Fig. 1 is a view in side elevation of a vehicle having combined steering and wheel mounting embodying my invention, a portion of the side wall being broken away for convenience of illustration.
Figure 2:
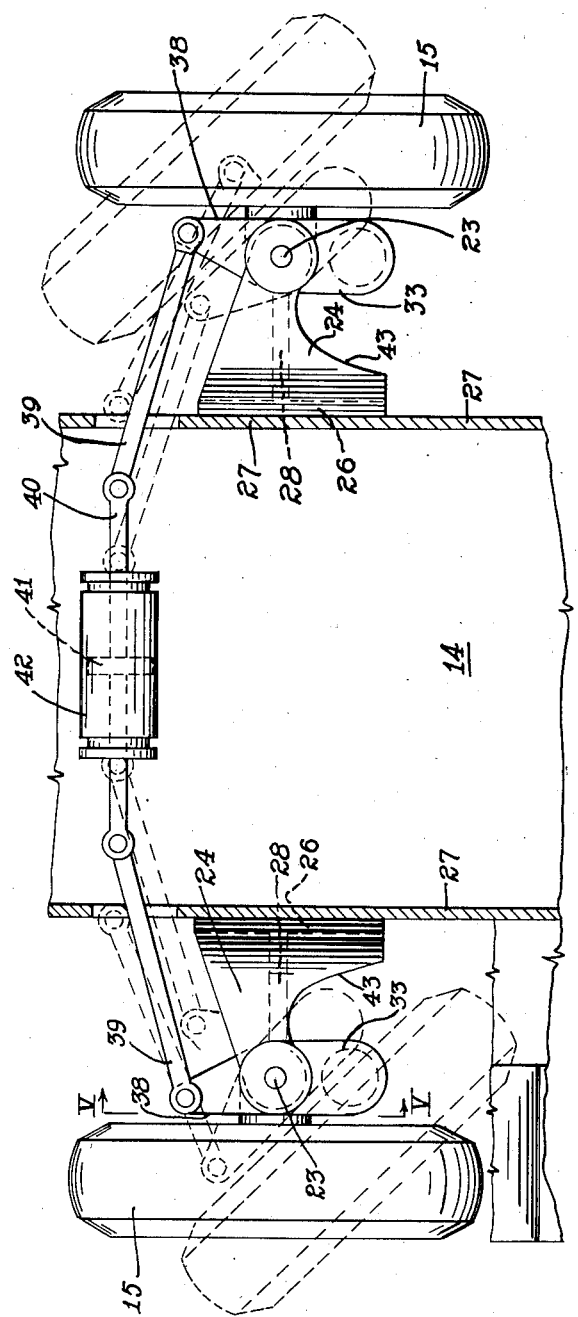
Fig. 2 is an enlarged sectional view taken on line II—II of Fig. 6.
Figure 3:
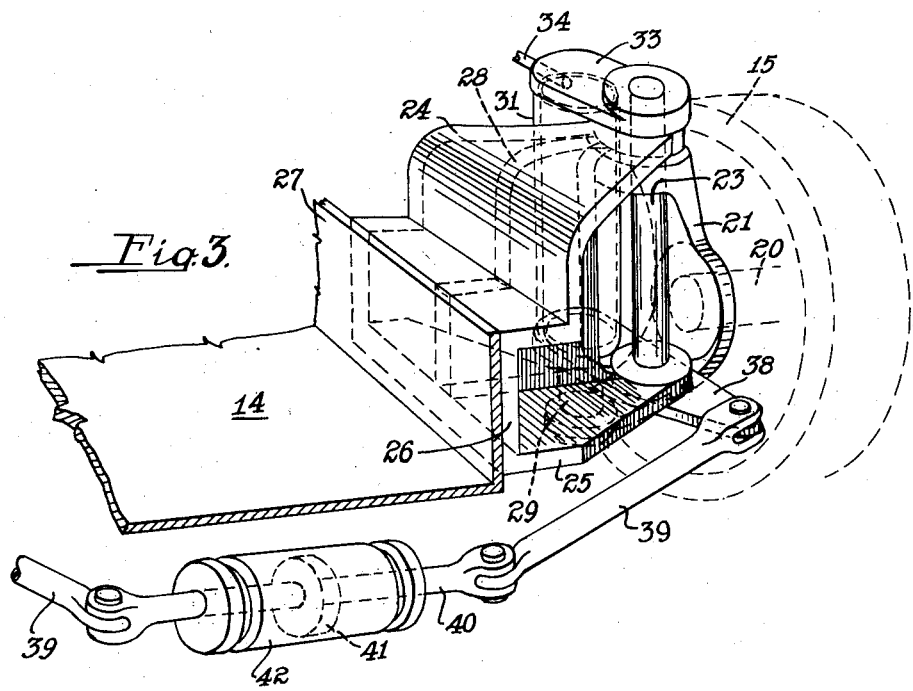
Fig. 3 is an enlarged view in perspective of one side of my wheel mounting device.
Figures 4, 5:
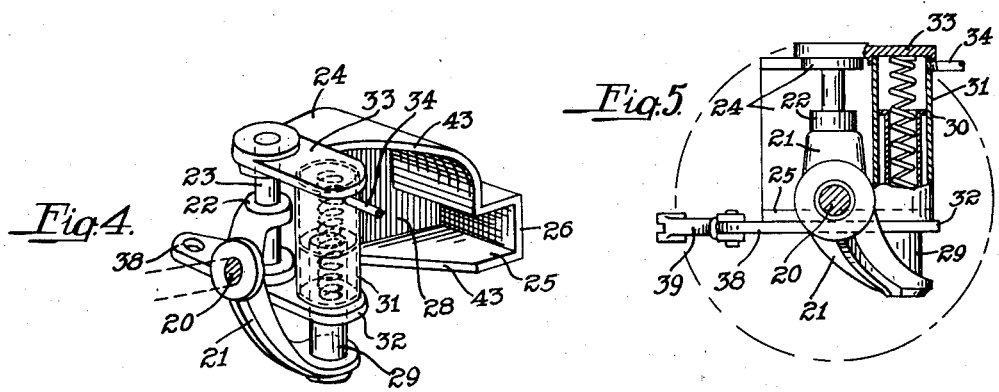
Fig. 4 is a perspective view showing the other side of the wheel mounting device.
Fig. 5 is a sectional view taken on line V—V of Fig. 2 and having a portion thereof broken away for convenience of illustration.
Figure 6:
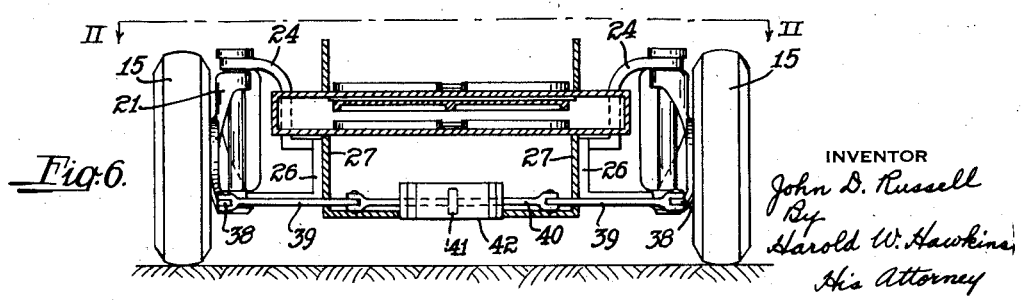
Fig. 6 is a sectional view taken on line VI—VI of Fig. 1.

While my improved wheel mounting and steering device is adapted to be used on any vehicle where it is desired to raise or elevate the body thereof relative to the wheels, it is particularly suitable for use on a mobile coal loading machine, such as illustrated in Fig. 1, where it is necessary to frequently change the elevation of discharge conveyor thereof. As illustrated, the loading machine designated in its entirety as 10, comprises a gathering head 11 pivotally mounted on a transverse axle shaft 12, having drive wheels 13 journaled on the ends thereof, and a body 14 also pivotally mounted on the shaft 12, and supported on each side by wheels 15, each carried by a device, made in accordance with my invention, which provide a spring suspension for the body 14, a mechanism for steering the loader 10, and a mechanism for elevating the body whereby the conveyor pan section 17 extending rearwardly of the body may be readily raised or lowered.

Each wheel 15 is mounted on a stub axle 20 projecting outwardly from the face of a wheel supporting member 21 of substantially arcuate shape, and having a collar 22 integral with the upper end thereof which is slidable on a vertically extending shaft 23. Shaft 23 is supported by the top and bottom legs 24—25 of a substantially U shaped member or bracket 26 having its base welded or otherwise secured to the side wall 27 of the body 14. The ends of the shaft 23 extend above and below the legs 24—25, the purpose of which will hereinafter be made apparent, and the legs 24—25 of the bracket 26 are braced and reinforced by a vertical fin or rib 28.

The lower end of the curved wheel supporting member 21 is connected to the end of a hollow rod 29 having a piston 30 on its opposite end which operates in an upright cylinder 31. The lower or bottom surface of cylinder 31 is supported on and is welded to a plate 32 extending underneath the bottom leg 25 of the bracket 26, and is journaled on the lower extended end of the shaft 23, and the top or upper surface of the cylinder is closed by and is welded to a cap plate 33 which slides over and rests on the top leg 24 of the bracket 26 and is journaled on the upper extended end of the shaft 23.

When it is desired to elevate or raise the conveyor pan section 17, fluid under pressure is admitted to the top of the upright cylinder 31 through a supply pipe 34 which tends to move the piston 30 toward the lower end of the cylinder. Since the lower end of the piston rod 29, however, is connected to the member 21 carrying the wheel 15, the piston 30 cannot move downwardly, but the body of the cylinder is moved upwardly carrying with it the bracket 26 and the body 14 to which the bracket is attached. As the bracket 26 moves upwardly the shaft 23 slides through the collar 22 of the wheel carrying member 21, and the collar 22 approaches the bottom leg 25 of the bracket 26.

When the body 14 is to be lowered, the pipe 34 is connected to exhaust through a suitable valve (not shown), and the weight of the body collapses or moves the cylinder 31 downwardly relative to the piston rod 30 and thus decreases the elevation of the conveyor pan section 17. At the same time shaft 23 passes downwardly through the collar 22 so that the collar approaches the top leg 24 of the bracket 26 which limits the downward movement of the body.

In order to absorb road shock when the loader 10 is traveling or moving from place to place, a compression spring 35 is positioned in each of the hollow piston rods 29 which bears against the bottom of the cap plate 33 and provides a spring suspension between the wheel and the body of the vehicle supported thereby.

In order to turn the wheels 15 and thus steer or guide the loader 10, the bottom plate 32 of each wheel mounting device is provided with a portion 38 which extends beyond the shaft 23 and forms a steering knuckle for turning the cylinder 31, the member 21 and the wheel 15 carried thereby. Each steering knuckle 38 has a rod 39 pivoted thereto for connecting the knuckle to the end of an oscillatory connecting rod 40. A piston 41 operating in a power cylinder 42 carried by the body 14 of the machine is secured to the connecting rod 40 for reciprocating the rod. By admitting fluid under pressure to the desired end of the cylinder 42, the connecting rod 40 may be moved in either direction to turn the wheels 15 in the proper direction to negotiate either a left hand or right hand turn.

It should be noted that the edges of the top and bottom legs 24—25 of the brackets 26 adjacent the cylinder 31 are cut away at 43 to receive the cylinder as the connecting rod 40 is moved from side to side to turn the wheels 15.

From the foregoing description of my invention it is apparent that I have provided a device for mounting wheels on a vehicle which not only acts as a shock absorber during the travel of the vehicle, but which also permits the elevation of the body relative to the supporting wheels to be varied readily.

While I have described one embodiment of my invention, it is understood that these functions may be performed by other exemplifications of the device illustrated without departing from the spirit of my invention or the scope of the appended claims.

What I claim as new and desire to secure by Letters Patent is:

1. A wheel mounting device for a vehicle comprising a bracket adapted to be secured to the side of a vehicle, a vertically extending shaft carried by said bracket, a wheel carrying member slidable on said shaft and a hydraulically operated expansible member disposed between said bracket and said wheel carrying member for moving said member vertically along said shaft.

2. A wheel mounting device comprising a substantially U shaped bracket having a base adapted to be secured to the side of a vehicle, a vertically extending shaft mounted in the legs of said bracket, a wheel carrying member slidably mounted on said shaft, and a hydraulic jack positioned between said bracket and said wheel carrying member for moving said member along said shaft to vary the position of said bracket relative to said wheel carrying member.

3. A wheel mounting device comprising a bracket adapted to be secured by the side of a vehicle, a shaft carried by said bracket, a wheel carrying member slidably mounted on said shaft, a piston rod connected to said member, a cylinder carried by said bracket and in which the piston rod operates a spring disposed in said cylinder and bearing against said piston rod, and means for introducing fluid pressure into said cylinder to move said wheel carrying member along said shaft.

4. A wheel mounting device for a vehicle comprising a bracket adapted to be mounted on the side of a vehicle, a vertically extending shaft carried by said bracket, a wheel carrying member slidably mounted on said shaft, a cylinder spaced from said shaft but pivotally mounted on the ends thereof, a piston mounted in said cylinder, a rod connecting said piston to said wheel carrying member, and means for turning said cylinder and said wheel carrying member about said shaft.

5. A device for mounting wheels on a vehicle comprising a bracket adapted to be secured to the body of a vehicle, a vertically extending shaft carried by said bracket, a wheel carrying member slidably mounted on said shaft, a hydraulic jack between said bracket and said wheel carrying member for moving said member along said shaft to vary the position of said bracket relative to said member, and means for turning said wheel carrying member.

6. A device of the character disclosed comprising a bracket adapted to be secured to the body of a vehicle, a vertically extending shaft carried by said bracket, a wheel carrying member slidably mounted on said shaft, a hydraulic jack, disposed between said bracket and said wheel carrying member for varying the elevation of said body relative to the wheel carrying member, and means associated with said hydraulic jack and operable when said jack is collapsed for absorbing road shocks.

7. A combined spring suspension and elevating device of the character disclosed, comprising a bracket adapted to be secured to the body of a vehicle, an upright shaft carried by said bracket, a member slidably mounted on said shaft, an axle carried by said member, a wheel mounted on said axle, and means for moving said member along said shaft to vary the elevation of said body relative to said axle, said means including a hydraulic jack having its piston attached to said member and its cylinder secured to said bracket.

8. A spring suspension and elevating device of the character disclosed, comprising a bracket adapted to be secured to the body of a vehicle, an upright shaft carried by said bracket, a member slidably mounted on said shaft, an axle carried by said member, a wheel mounted on said axle, and means for moving said member along said shaft to vary the elevation of said body relative to said axle, including a hydraulic jack having its piston attached to said member and its cylinder fixed with relation to said bracket but rotatable about said shaft, and a spring interposed between said piston and the end of said cylinder.

9. A spring suspension and elevating device of the character disclosed, comprising a bracket adapted to be secured to the body of a vehicle, a shaft carried by said bracket, a member slidably mounted on said shaft, an axle carried by said member, a wheel mounted on said axle, means for moving said member along said shaft to vary the elevation of said body, including a hydraulic jack having its piston attached to said member and its cylinder in fixed relation with said bracket but rotatable about said shaft, and a spring interposed in said jack between the piston and the end of the cylinder, and means for rotating said member and said member moving means to turn the wheel carried thereby and steer said vehicle.

JOHN D. RUSSELL.